United States Patent
Gellini (10) Patent No.: US 6,758,118 B2
(45) Date of Patent: Jul. 6, 2004

(54) BAR FEEDER PROVIDED WITH BAR FACING DEVICE

(75) Inventor: Saverio Gellini, Faenza (IT)

(73) Assignee: IEMCA Giuliani Macchine Italia S.r.l., Faenza (IT)

(*) Notice: Subject to any disclaimer, the term of this patent is extended or adjusted under 35 U.S.C. 154(b) by 5 days.

(21) Appl. No.: 09/731,810

(22) Filed: Dec. 8, 2000

(65) Prior Publication Data

US 2001/0003934 A1 Jun. 21, 2001

(30) Foreign Application Priority Data

Dec. 16, 1999 (IT) .......................... BO99A0687

(51) Int. Cl.[7] .................. B23B 13/00; B23B 13/10
(52) U.S. Cl. .......................... 82/124; 82/127
(58) Field of Search ................... 82/123, 125, 126, 82/127, 124, 130; 279/119; 409/200; 475/162

(56) References Cited

U.S. PATENT DOCUMENTS 3,774,753 A    11/1973   Jones
5,140,878 A   *   8/1992   Fabbri ........................ 82/127

FOREIGN PATENT DOCUMENTS

GB           691 087        5/1953

* cited by examiner

Primary Examiner—A. L. Wellington
Assistant Examiner—Brian D. Walsh
(74) Attorney, Agent, or Firm—Guido Modiano; Albert Josif; Daniel O'Byrne (57) ABSTRACT

A bar feeder for feeding an automatic lathe, comprising a bar magazine and a guide supplied by the magazine, a facing device being associated with the end of the magazine that lies opposite to the end that is adjacent to the lathe and being suitable to machine the rear end of the bar on which the bar pusher engages.

12 Claims, 10 Drawing Sheets

BAR FEEDER PROVIDED WITH BAR FACING DEVICE

BACKGROUND OF THE INVENTION

The present invention relates to a bar feeder provided with a bar facing device.

As it is known, in feeders used for feeding automatic lathes, the bar to be machined is taken from a magazine and placed in a guiding channel along which a pusher element, known as bar pusher, moves. Said bar pusher acts on the rear end of the bar and causes it to advance in successive steps which are equal in length to the machined parts to be obtained.

With these feeders it is not possible to machine the last portion (end segment) of the bar; since said portion cannot be gripped by the collet of the lathe because the bar has been used up, it is allowed to drop, causing problems for removing it from the lathe.

Bar feeders are also known in which the end portion of the bar can be recovered by fitting the bar pusher with a specifically provided collet suitable to grip the rear end of the bar inserted in the guiding channel. Thereby, when the bar is used up, the end portion remains attached to the collet and can be recovered when the bar pusher is retracted. However, in said bar feeders the outside dimensions of the collet must be greater than the diameter of the bar and therefore there are considerable problems in providing the guide in order to prevent vibrations and noise due to knocking inside said guide.

It should also be noted that the bars are available with opposite ends that have uneven regions due to cropping. These uneven regions, in order to avoid off-centering upon engagement of the bar pusher, are often removed by subjecting the bar to preliminary facing in a machine tool, hence with considerable additional costs.

SUMMARY OF THE INVENTION

The aim of the present invention is to provide a feeder equipped with a device which is suitable to perform the facing of the rear end of the bars within the machining cycle of said bars and therefore with a significant reduction in machining costs.

Within this aim, an object of the present invention is to provide a feeder equipped with a device which is suitable to prepare the rear end of the bars so as to allow to use a bar pusher provided with a collet having diametrical dimensions that do not exceed the dimensions of the bar to be machined thereby allowing to recover the end portion of the bar and also eliminate vibration and noise.

This aim and this object are achieved with a bar feeder for feeding an automatic lathe, comprising a bar magazine and a guide supplied by said magazine, characterized in that a facing device is associated with the end of said magazine that lies opposite the end that is adjacent to said lathe and is suitable to machine the rear end of the bar on which the bar pusher engages.

BRIEF DESCRIPTION OF THE DRAWINGS

Further characteristics and advantages of the present invention will become better apparent from the following description illustrated in the accompanying drawings, wherein.

DESCRIPTION OF THE PREFERRED EMBODIMENTS

Figure 1:
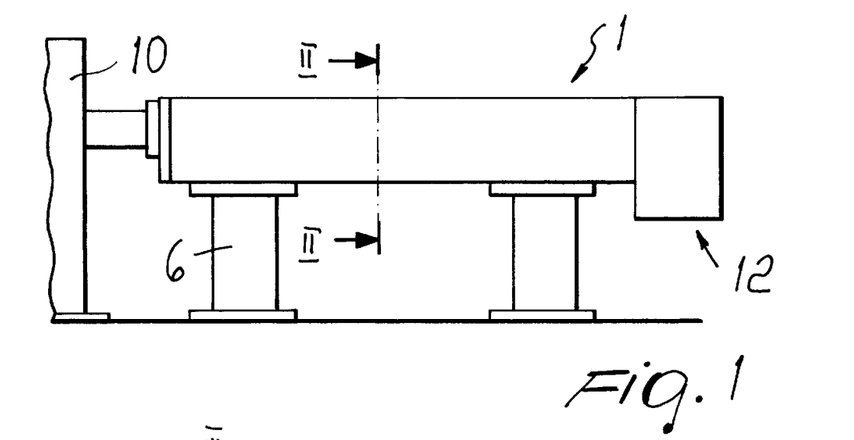
FIG. 1 is a schematic elevation view of a bar feeder according to the invention.
Figure 2:
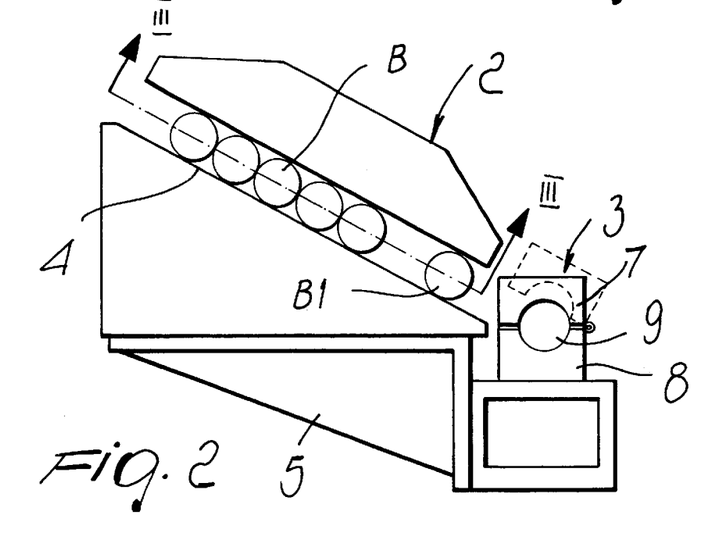
FIG. 2 is a sectional view, taken along the line II—II of FIG. 1.
Figure 3:
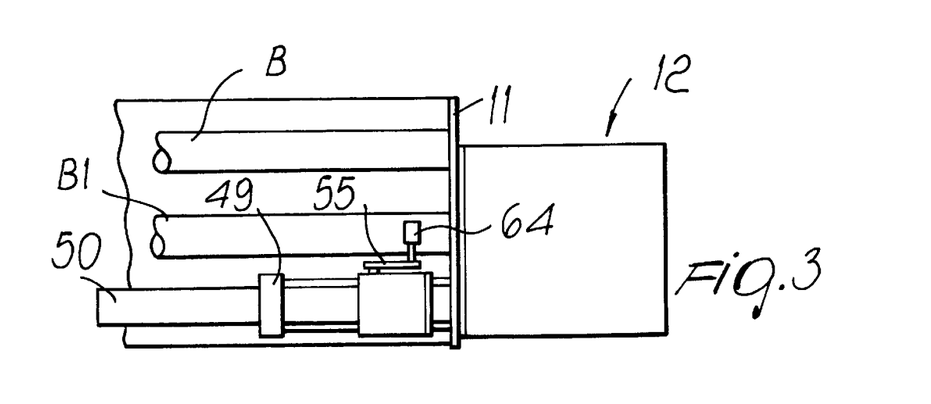
FIG. 3 is a sectional view, taken along the line III—III of FIG. 2.

With reference to FIGS. 1 to 3, 1 generally designates a conventional bar feeder; its magazine 2 for the bars B to be machined and the guide 3 along which the bars are guided to the lathe in which they are subjected to the intended machining are pointed out in order to clarify the present invention.

The expression "bars B" is understood to designate solid rods having a circular or polygonal cross-section and pipes.

The magazine 2 comprises an inclined surface 4 for supporting the bars B which is supported by the frame 5 of the bar feeder, which rests on the ground by means of posts 6. By way of known singling-out means, not shown, the lowermost bar B is released from the magazine in order to be inserted in the guide 3. In order to receive the bar, the guide 3 is composed of two half-shells 7 and 8 which are mutually pivoted and actuated by appropriate actuators, which are known and therefore are not illustrated, between an open position (shown in dashed lines in FIG. 2), which allows the released bar to enter the guide, and a closed position, in which the two half-shells 7 and 8 define a closed channel 9 which allows a bar pusher to make the bar advance in steps towards the lathe 10.

A side wall 11 is rigidly coupled to the surface 4, at the opposite end with respect to the lathe 10, and a device 12 is mounted thereon: said device performs the facing of the bars arranged on the surface 4. It should be noted that the term "facing" is used to designate any machining performed on the end of the bar which entails chip-forming, such as turning, boring, or drilling.

Figure 4:
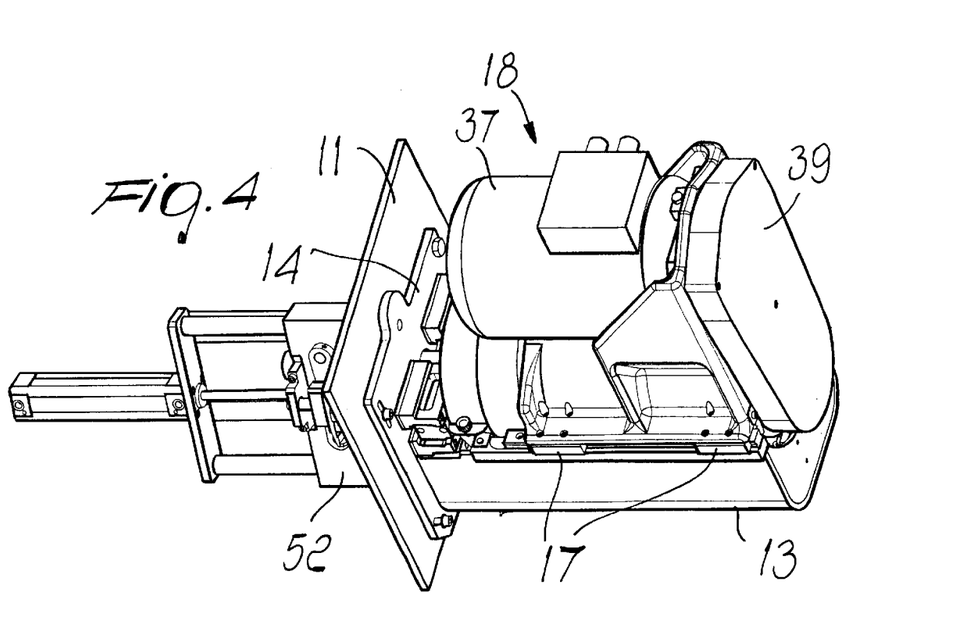
FIG. 4 is a perspective view of the facing device according to a first embodiment.
Figure 5:
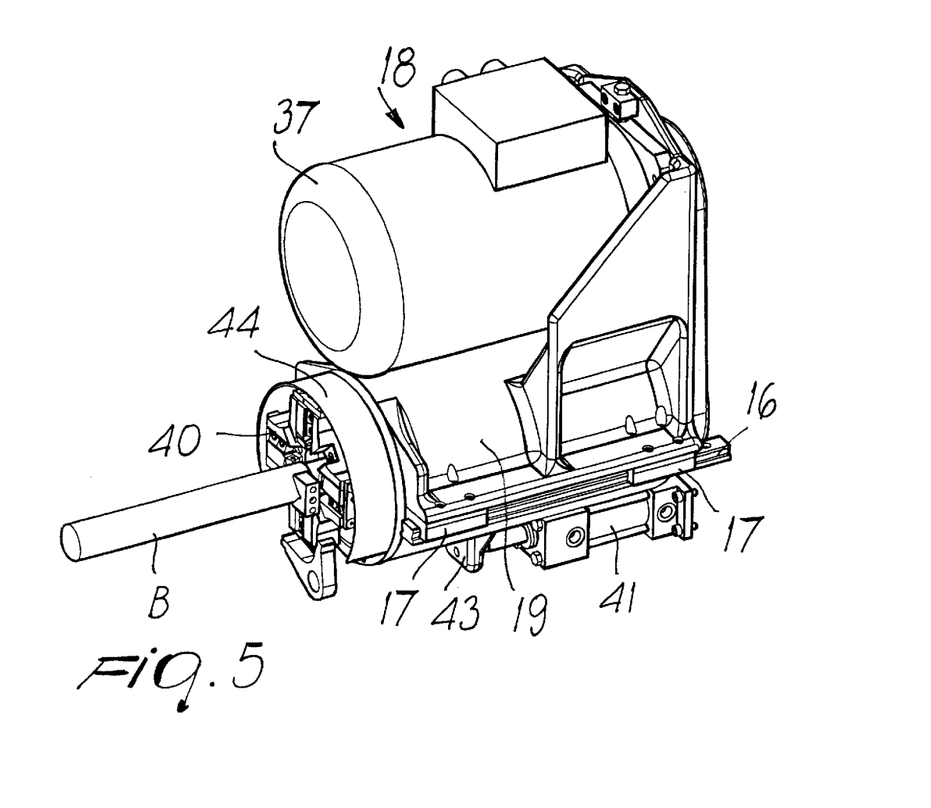
FIG. 5 is a partial perspective view of the device.

The device 12 (FIGS. 4 and 6) comprises a footing being shaped like a half-box 13 (FIG. 7) rigidly coupled to a plate 14 by means of which it is fixed with screws 15 to the side wall 11 so as to cantilever out. The half-box 13 has two parallel walls, on the upper edges whereof two parallel rails 16 are fixed; the sliders 17 (FIGS. 4 and 5) of a movable unit 18 slide on said rails.

Said unit 18 comprises a cylindrical shell 19 inside which a sleeve 22 (FIG. 10) is rotatably supported according to the axis A by means of bearings 20 and 21. An interspace 23 remains between the sleeve 22 and the cylindrical shell 19 and accommodates, in an intermediate position, a ring gear 24 with internal teeth which is fixed to an internal collar of the shell 19.

Figure 10:
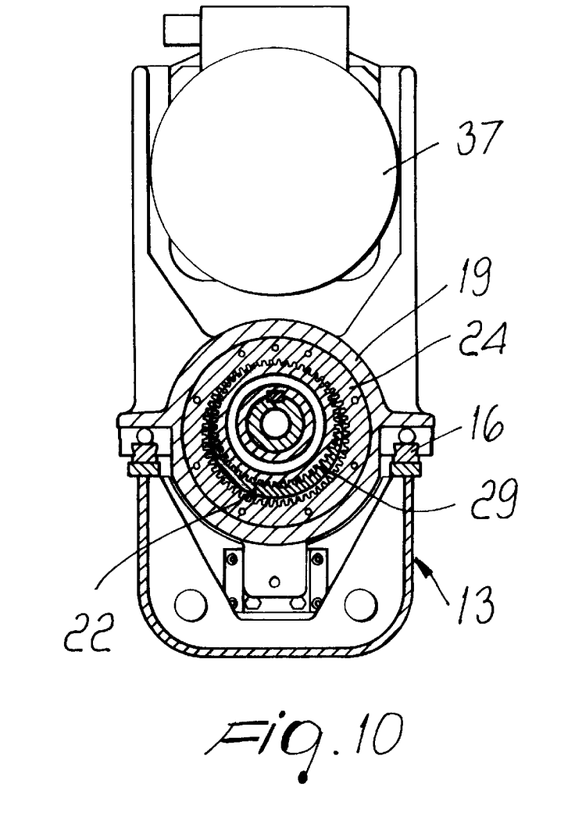
FIGS. 10, 11 and 12 are axial sectional views, taken along the lines X—X, XI—XI, XII—XII of FIG. 6.
Figure 11:
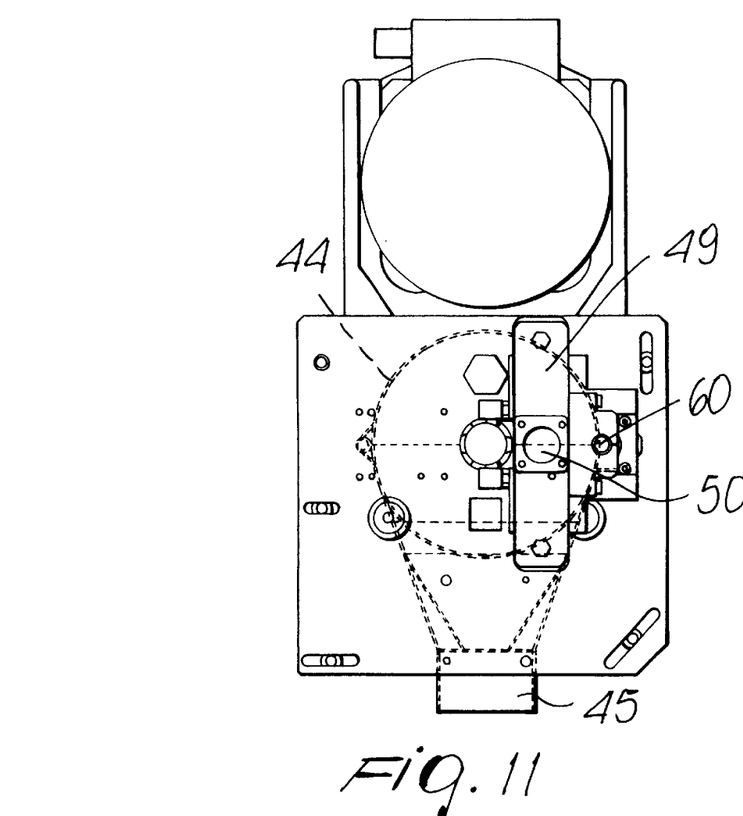

The sleeve 22 encloses a cylindrical cavity 25 whose axis C is eccentric with respect to the axis A. A hollow shaft 28 is rotatably supported in said cavity 25 by means of bearings 26 and 27, and a gear 29 is keyed on said shaft.

The keying of the gear 29 on the shaft 28 is rotationally provided by means of a key 30 and is axially provided by means of spacer bushes 31 and 32 which lie between the gear 29 and the bearings 26 and 27.

The gear 29 meshes with the gear 24 by means of an opening 33 which covers an arc of the sleeve 22.

Figure 6:
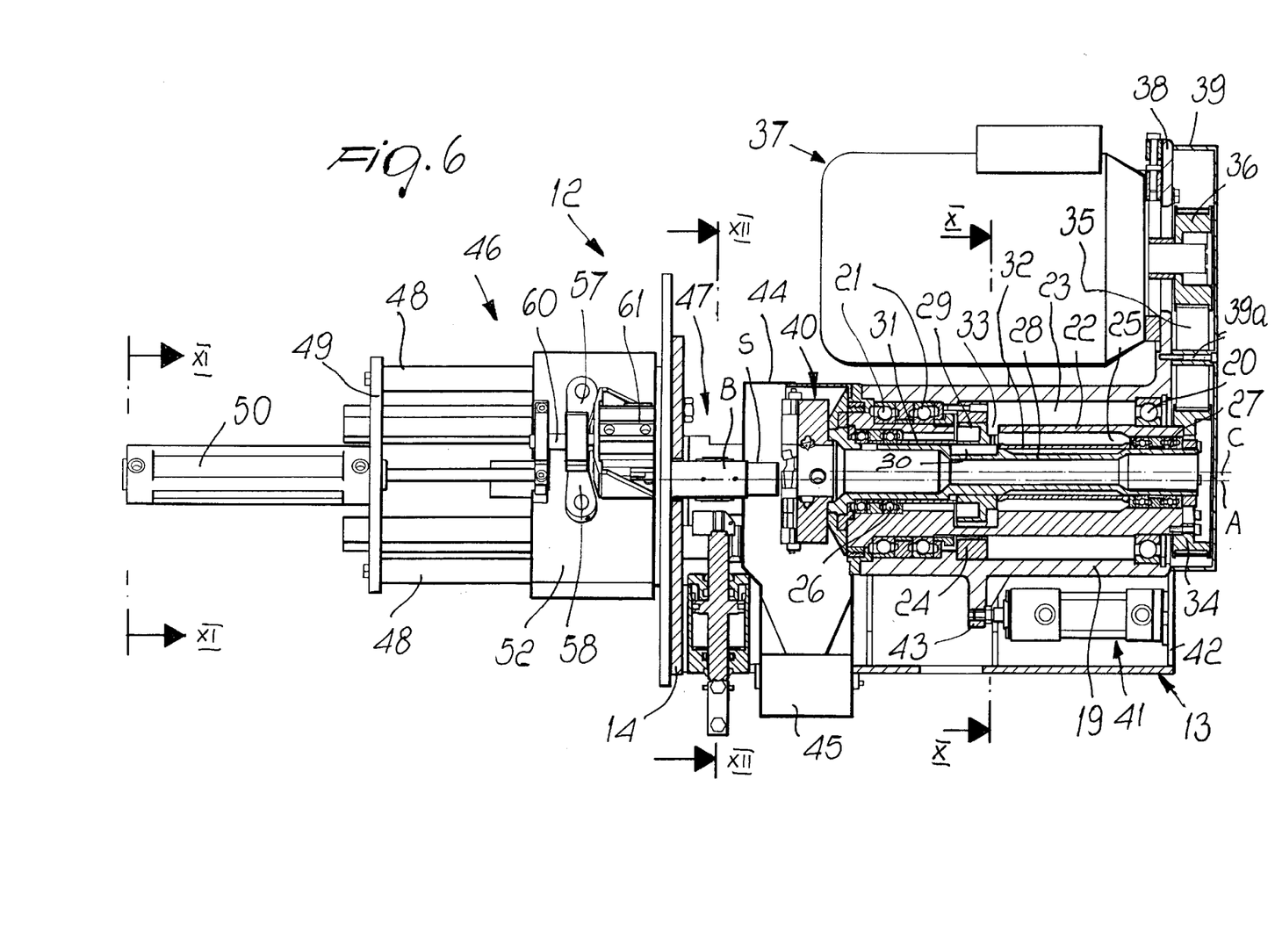
FIG. 6 is a longitudinal sectional view of the device.
Figure 7:
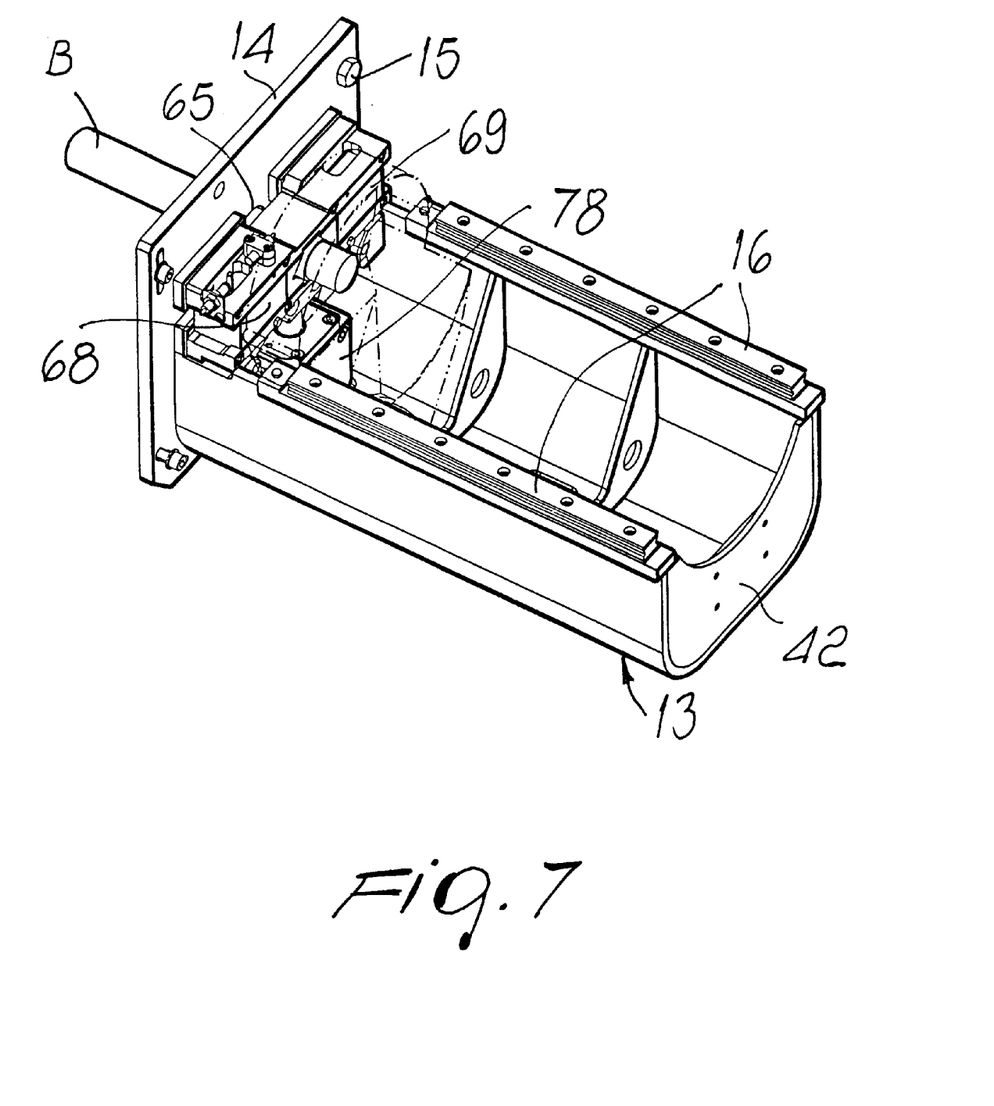
FIG. 7 is a perspective view of the footing of the device.

The hollow shaft 28 has an end, the right one in FIG. 6, which protrudes out of the sleeve, and a pulley 34 is rotatably rigidly coupled thereon. A belt 35 is wound around the pulley 34 and is closed in a loop around a second pulley 36 keyed on the output shaft of a motor 37 mounted on a flange 38 which rises from the cylindrical shell 19.

The transmission composed of the belt 35 and the pulleys 34, 36 is covered by a housing 39 which is fixed to the flange 38 by means of screws 39a.

The hollow shaft 28, at the end that lies opposite the pulley 34, is preset for the coupling of a tool 40 which, in the illustrated example, is of the type suitable to perform the external machining of a bar B which is aligned with the axis A, transferred from the magazine 2 and is arranged in front of it.

The bar B is machined by combining the axial movement of the unit 18 with the rotation of the tool 40.

Axial movement is actuated by a fluid-actuated jack 41 accommodated in the half-box 13 below the unit 18 and in which the cylinder is rigidly coupled to the head wall 42 of the half-box and the stem acts on a lug 43 which protrudes downwards from the shell 19. By activating the jack 41, the unit 18 is moved axially along the rails 16. At the same time, the rotation imparted to the hollow shaft 28 by the motor 37 determines, due to the eccentricity of the axis C of the shaft 28 with respect to the axis A of the sleeve 19 and due to the meshing of the gears 24, 29, an orbital movement of the hollow shaft 28 and therefore of the tool 40 and the gradual removal of an outer layer S of the end of the bar B. The chips formed during this machining are collected by a housing 44 which surrounds the tool 40, leaving a front opening for the bar B, and are collected in a container 45 fixed below the half-box 13.

In order to position the bar B in front of the tool 40, the described device 12 provides for a translatory assembly 46, which picks up the bar B from the magazine 2 and moves it toward the tool by a preset extent, and a locking assembly 47 which keeps the bar locked during machining.

Figure 8:
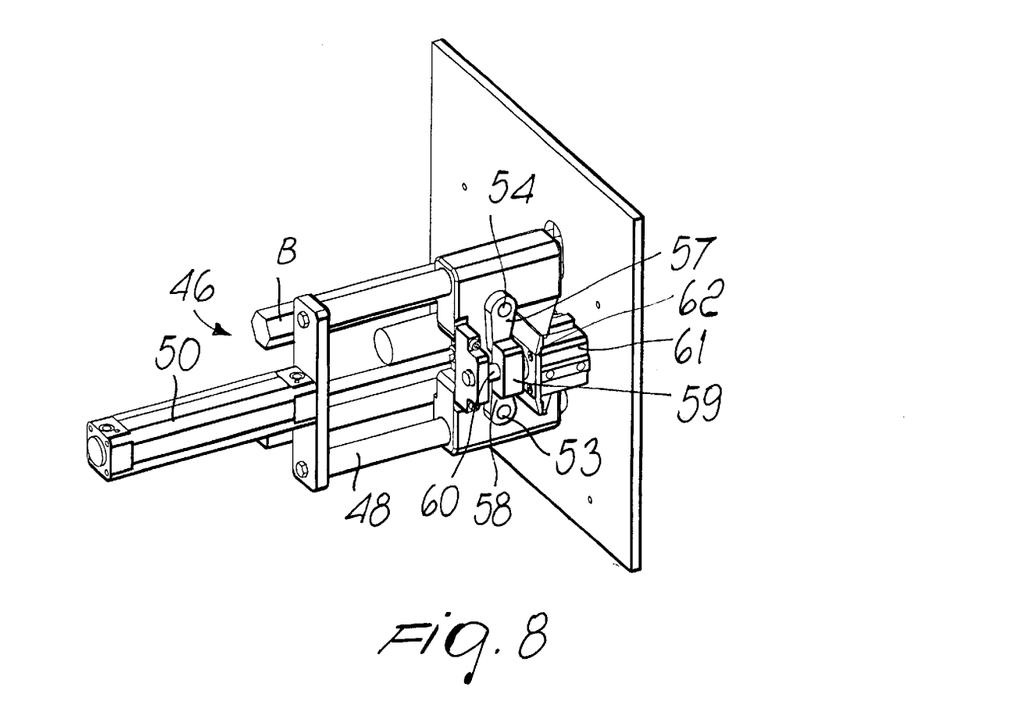
FIGS. 8 and 9 are two perspective views, taken from opposite sides, of a unit of the device.
Figure 9:
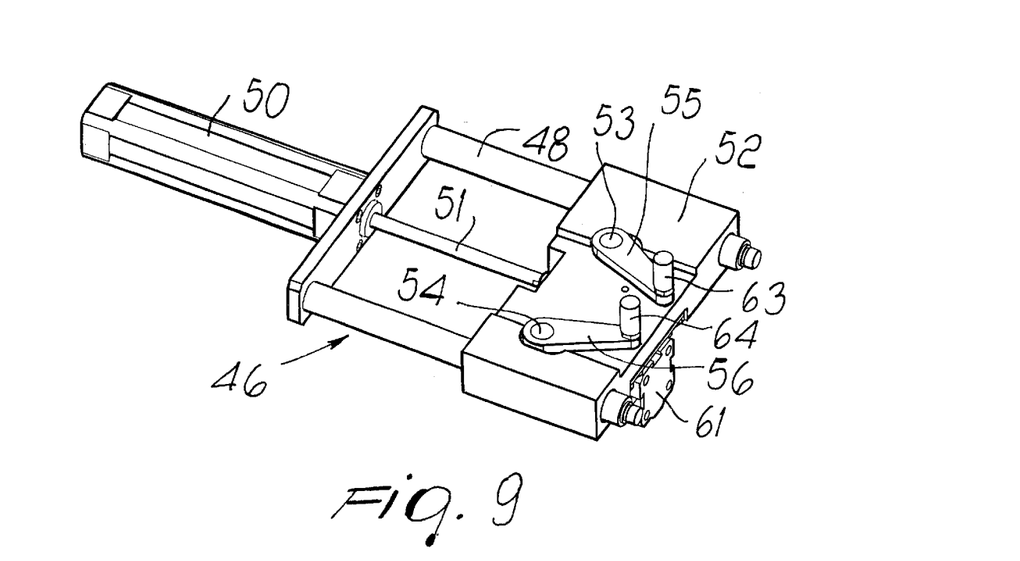

The translatory assembly 46 comprises (FIGS. 8 and 9) two rods 48 which are parallel to the axis A and are fixed to the plate 14 so as to cantilever out. The rods 48 are connected one another by a cross-member 49 on which an actuator 50 is fitted; said actuator is constituted by a fluid-actuated jack whose stem 51 is connected to a carriage 52 which can slide on the rods 48.

Two pivots 53 and 54 are pivoted in the carriage 52 and are perpendicular to the rods; on the opposite sides of the carriage, said pivots support respective arms 55, 56 and 57, 58.

The arms 57, 58 are articulately connected to a block 59 which is fixed to the stem 60 of a jack 61 whose axis is parallel to the rods 48.

The jack 61 is coupled, by means of a flange, to an L-shaped element 62 being fixed laterally to the carriage 52.

The arms 55, 56 have, at their ends, jaws 63, 64 which are constituted by cylinders which are parallel to the pivots 53, 54.

As will become better apparent hereinafter, by activating the jack 61 the jaws 63, 64 are actuated so as to grip the end of a bar B which is arranged between them, whereas by activating the jack 50 the bar B performs an advancement stroke towards the tool 40 through an opening of the side wall (not shown in the drawings) and an opening 65 (FIG. 7) of the plate 14.

Figure 12:
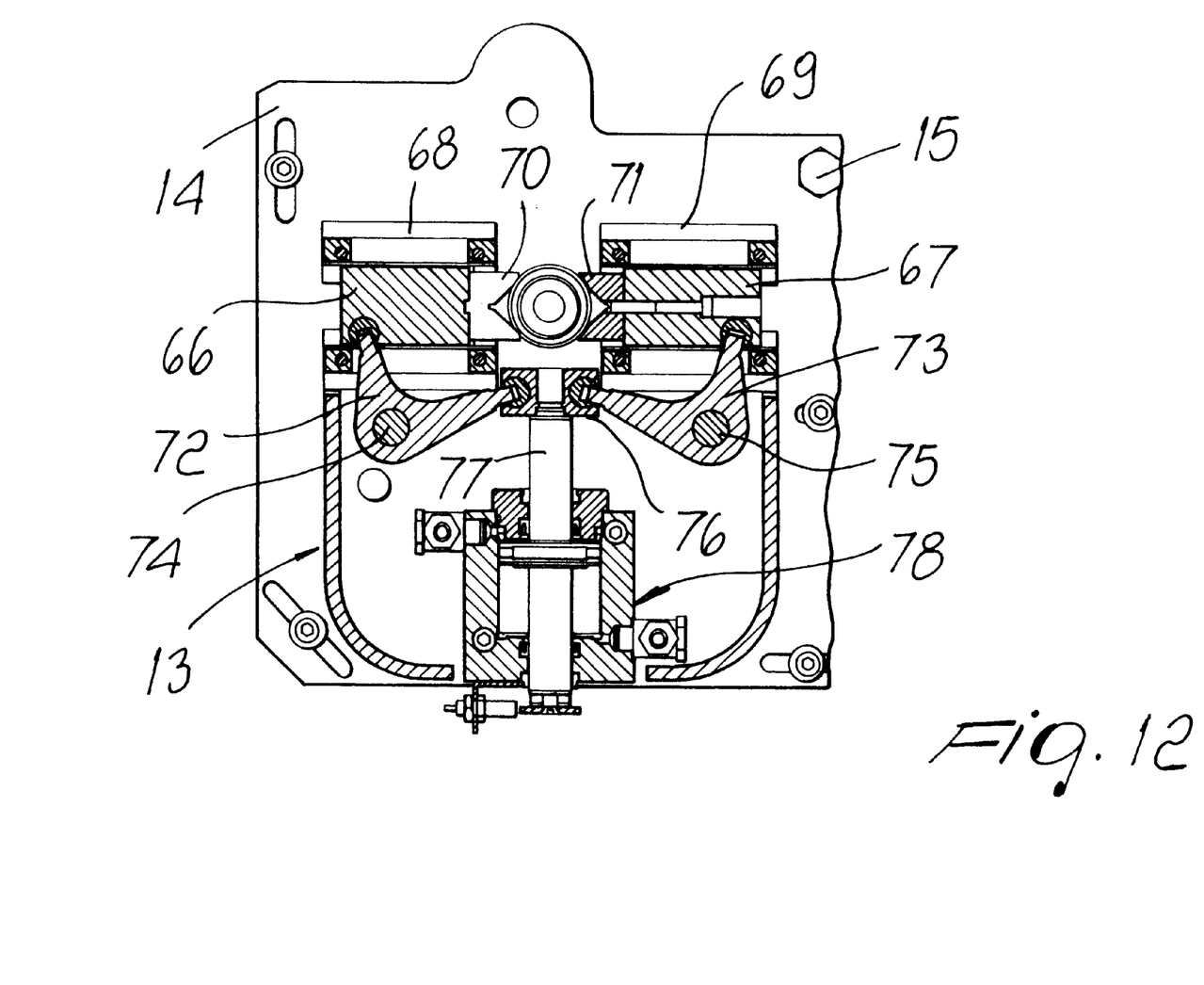

After passing through the plate 14, the bar B is gripped by the assembly 47, which as shown more clearly in FIG. 12 comprises two sliders 66 and 67 which can slide in respective guides 68 and 69 rigidly coupled to the plate 14 and have mutually opposite jaws 70 and 71.

The sliders 66 and 67 are moved in opposite directions one another by means of two levers 72 and 73 which are pivoted in a rocker-like manner on pivots 74 and 75 rigidly coupled to the plate 14. The levers 72 and 73 have an arm which is pivoted in the sliders 66 and 67 and another arm which is pivoted in an element 76 rigidly coupled to the end of the stem 77 of a double-acting fluid-actuated jack 78 which is fitted inside the half-box 13, between the plate 14 and the housing 44.

The operation of the described bar feeder is evident from the above description and can be summarized as follows. By virtue of an appropriate singling-out unit of a type widely used in the manufacture of bar feeders, the last bar, i.e. the bar B1, i.e. the lowest among the ones arranged on the inclined surface 4 of the magazine 2, is spaced from the others and aligned with the jaws 63 and 64 of the translatory assembly 46.

In a first step, the carriage 52 is actuated into a position in which the jaws 63 and 64, when the jack 61 is activated, grip the end of the bar B1 and then, when the jack 50 is activated, transfer it in front of the tool 40. In this position, the jack 78 is activated and locks the bar by actuating the jaws 70 and 71.

The subsequent step provides for the advancement of the unit 18 by means of the jack 14 and the facing of the bar by means of the tool 40. Once said machining has ended, the return of the unit 18 is actuated and the jaws 70 and 71 are released, so as to allow to reposition the bar in the magazine.

It is evident that the invention fully achieves the intended aim and object. In particular, it should be noted that the facing of the bar occurs while another bar is being machined in the lathe, i.e., with a considerable cost saving.

Another considerable advantage is the use of a facing device which, by virtue of the orbital motion of the tool, farms small chips which as such are easy and practical to remove.

The invention is susceptible of numerous modifications and variations, all of which are within the scope of the appended claims.

Figure 13:
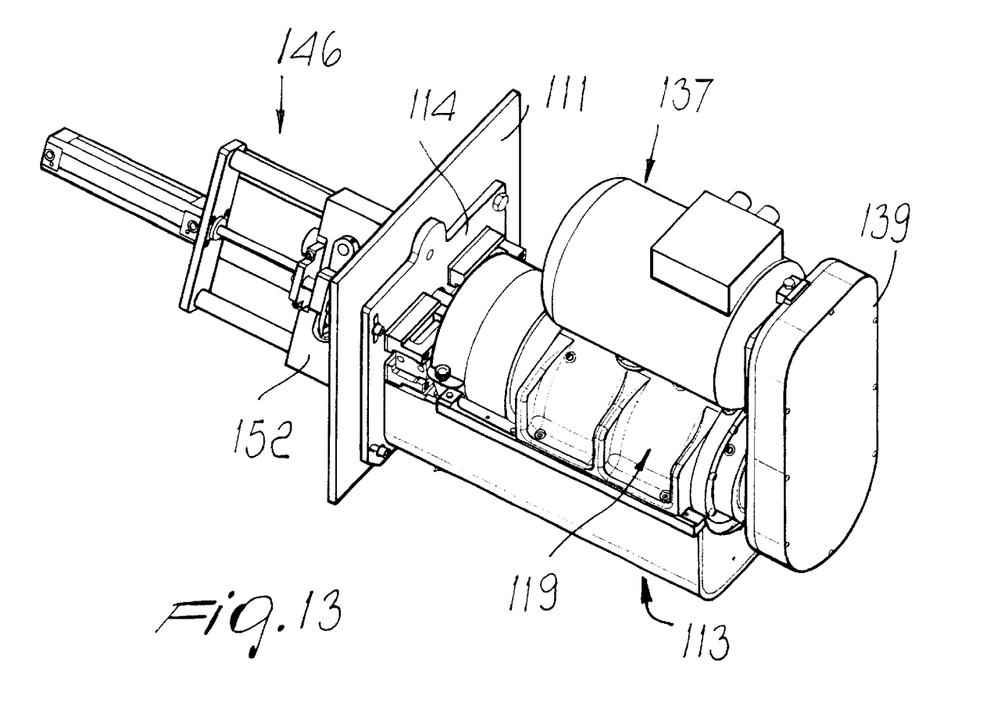
FIG. 13 is a perspective view of a second embodiment of the device according to the invention.
Figure 14:
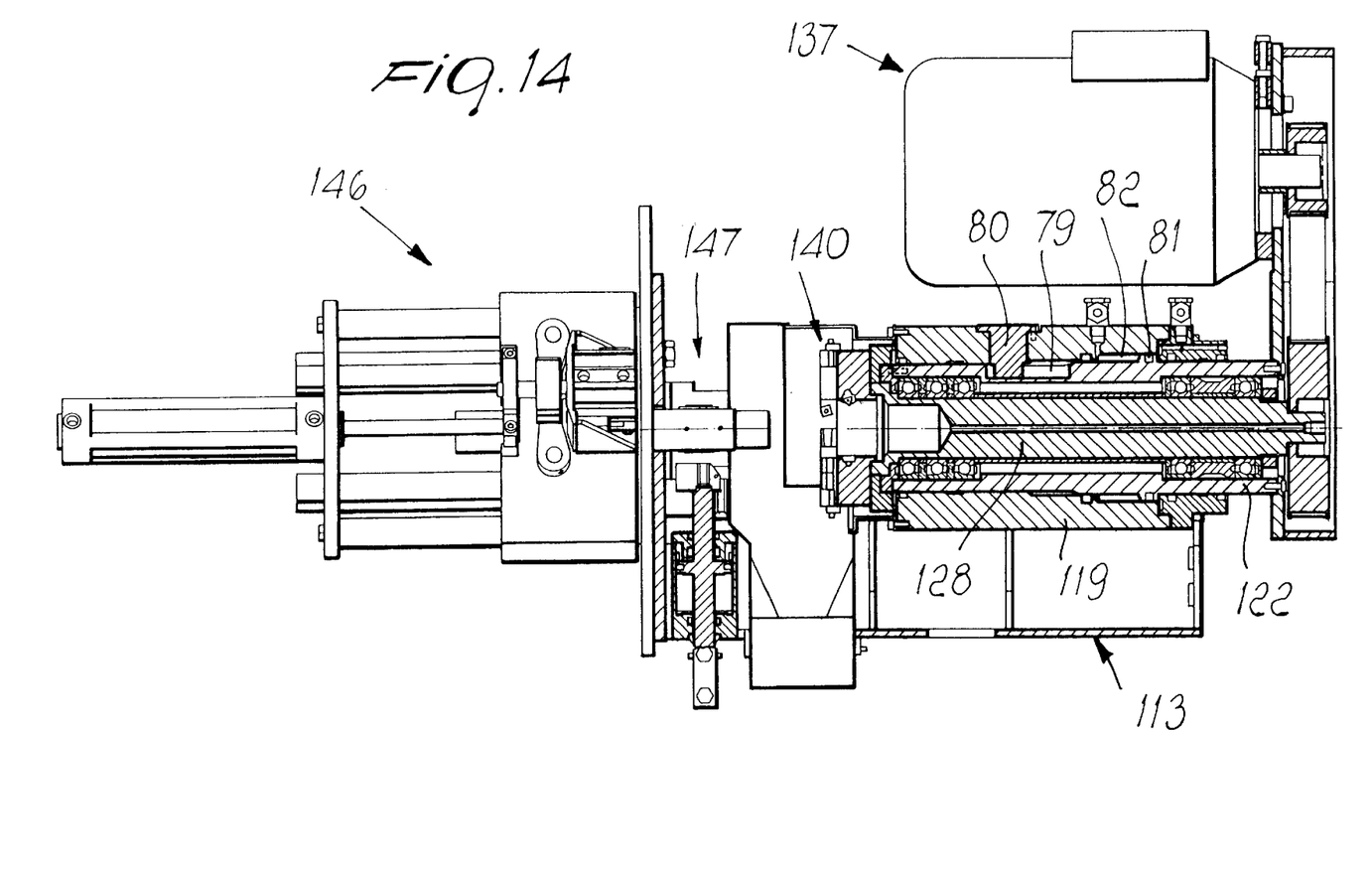
FIG. 14 is a longitudinal sectional view of the device of FIG. 13.
Figure 15:
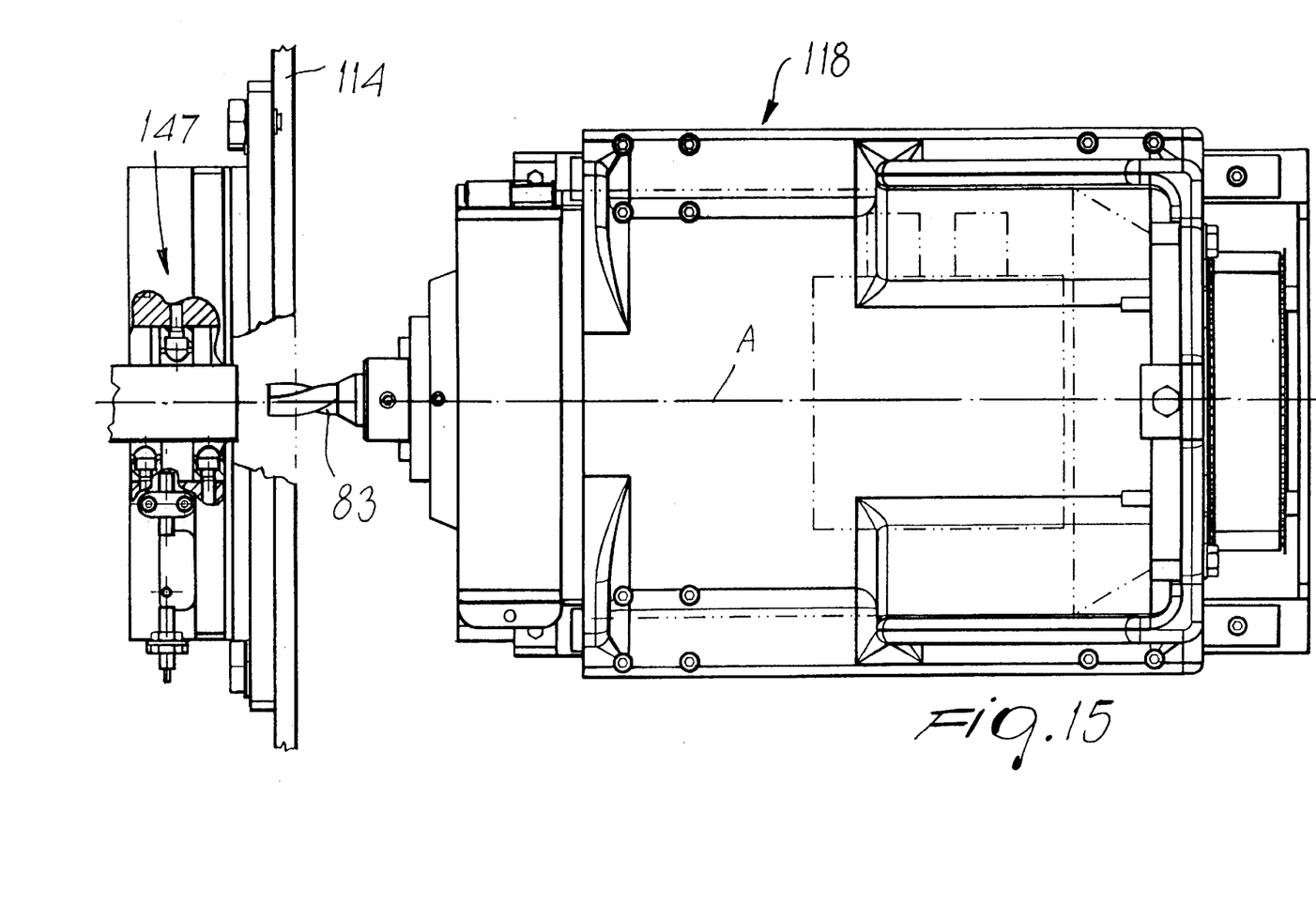
FIG. 15 is a plan view of a device according to a further variation.

FIGS. 13–15 illustrate a facing device in which the components that are identical or equivalent to those of the device of FIGS. 4–12 are designated by the same reference numerals increased by 100. The assemblies 146 and 147 are fully identical.

The differences consist in that the advancement of the tool 140 is achieved not by moving the unit 118, as in the preceding example, but by rotatably supporting the shaft 128 coaxially in the sleeve 122 and guiding said sleeve axially into the shell 119 without turning about its own axis.

For this purpose, the sleeve 122 is externally provided with an axial groove 79 which is engaged by a pin 80 protruding inside the shell 119. In order to allow the movement of the sleeve 122, on the outside of said sleeve there is a collar 81 which slides sealingly in a seat 82 provided in the internal wall of the shell 119. The collar 81 constitutes, in practice, a piston which divides the seat 82 into two chambers which are connected to the delivery and the return of a pressurized liquid, so as to determine the advancement of the sleeve 122 and of the tool 140 toward the bar B in order to perform facing and then retract the tool once facing has been completed.

Another variation of the device of FIGS. 13 and 14, shown in FIG. 15, entails machining the bar directly on the surface 4 of the magazine 2, so that the translatory assembly 146 is no longer necessary.

In this variation, the locking assembly 147 is arranged on the opposite side of the plate 114 so that its jaws can move at right angles to the surface 4 in order to allow, in the open condition, the ends of the bars to pass between them and allow, in the closed condition, the bar to be machined to stop in alignment with the axis A. Once the bar has been locked, the unit 118 can be made to advance in order to perform facing.

The device of FIG. 15 is particularly suitable for performing facings consisting of a simple axial hole of the bar, which can be provided by means of a drilling tool 83.

Figure 16:
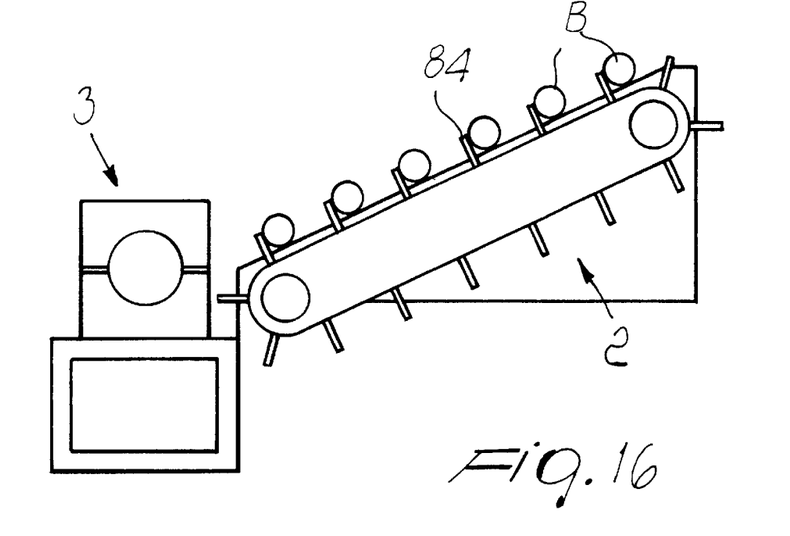
FIG. 16 is a transverse sectional view of a modified bar feeder.

Still another variation of the invention, shown in FIG. 16, uses on the surface 4 of the magazine 2 a toothed spacer 84 which is suitable to maintain mutual separation of the bars B arranged on the surface 4, in order to allow the arrangement of the translatory assembly 46 and the machining of the bar that lies upstream of the lowermost bar.

The disclosures in Italian Patent Application No. BO99A000687 from which this application claims priority are incorporated herein by reference.

What is claimed is:

1. A bar feeder for feeding bars to an automatic lathe, comprising: a magazine for the ban having a first end and a second opposite end, said magazine being arranged with said second end thereof adjacent to the automatic late; a bar guide formed by said magazine and along which the ban are guided to the automatic lathe; an end bar facing device, arranged at said first end of said magazine to machine a rear end of a bar; and a bar pusher which engages the rear end of said bar, subsequent to face machining thereof, to make the bar advance with an opposite front end thereof towards the automatic lathe.

2. The bar feeder of claim 1, wherein said facing device comprises: a footing which is mounted on a side wall of said bar feeder; a unit, supported at said footing, for motorizing a tool; a translatory assembly; grip means provided at said translatory assembly, said grip means being actuatable between a position for taking a bar from said magazine and a stop position in which the rear end of said bar is arranged in front of said tool; a locking assembly for locking said bar in said stop position, said tool being movable between an inactive position and a position for machining said bar rear end.

3. The bar feeder of claim 1, wherein said facing device further comprises: a footing which is mounted on a side wall of said bar feeder; a unit, supported at said footing, for motorizing a tool; and a locking assembly for locking a bar in the bar feeder, said tool being movable between an inactive position and a position for machining said bar rear end.

4. The bar feeder of claim 2, wherein said unit comprises: a cylindrical shell; a gear with internally arranged teeth which is fixed inside said cylindrical shell; a sleeve being coaxially and rotationally supported inside said shell so as to rotate about a central axis; a shaft being supported inside said sleeve on a further axis which is eccentric with respect to the central axis of said sleeve; a further gear being keyed on said shaft and meshing with said gear, which is fixed inside the shell, through an opening of said sleeve; a coupling being provided, at a first end of said shaft which is directed towards said side wall, for receiving said tool in a position adapted for machining said bar; a driven pulley being provided at a second opposite end of said shaft; a transmission belt; a driving pulley; and an actuation motor which is supported on said cylindrical shell, said driven pulley being connected by way of said transmission belt to said driving pulley, said driving pulley being keyed on a shaft at said actuation motor.

5. The bar feeder of claim 3, wherein said unit comprises: a cylindrical shell; a sleeve, which is supported inside said shell so as to be axially slideable and prevented from rotating; a shaft being supported so as to rotate coaxially inside said sleeve; a coupling for said tool arranged so as to machine said bar, said coupling being provided at a first end of said shaft that is directed toward said side wall; a driven pulley provided at a second end of said shaft; and a transmission belt; a driving pulley; a driving motor supported on said shell, said driven pulley being connected by way of said transmission belt to said driving pulley, said driving pulley being keyed on a shaft of said driving motor; a collar, provided externally to said sleeve, which is sealingly slideable in a seat provided inside said cylindrical shell; said collar forming a piston which divides said seat into two chambers, said chambers being arranged for allowing delivery therein and return therefrom of a pressurized fluid, so as to cause the advancement of said tool for facing the bar and retraction of said tool once facing has been completed.

6. The bar feeder of claim 4, wherein said translatory assembly comprises: rods fitted on said footing parallel to said shaft; a carriage slideable on said rods; grip jaws fitted on said carriage; an actuator for actuating said grip jaws, also fitted on said carriage; a carriage actuator for actuating said carriage between a position in which said jaws grip a bar taken from said magazine and a stop position in which an end of said bar is arranged in front of said tool.

7. The bar feeder of claim 6, comprising: arms supported so as to oscillate on said carriage, said arms being actuated for movement in opposite directions of one another by said actuator, said grip jaws being mounted at the ends of said levers.

8. The bar feeder of claim 7, wherein said locking assembly comprises: sliders movable in opposite directions; two driving levers which are pivoted in a rocker-like fashion in said footing far moving said sliders; two jaws fixed to said sliders, said levers having a first arm, which is articulately connected to a respective one of said sliders, a second arm and an arm actuator, said second arm being controlled for movement by said arm actuator.

9. The bar feeder of claim 8, wherein said locking assembly is arranged between said translatory assembly and said unit.

10. The bar feeder of claim 9, further comprising a bar spacer arranged on said magazine.

11. An automatic lathe and a bar feeder for feeding bars to the automatic late, the bar feeder comprising:

a magazine for the bars having a first end and a second opposite end, said magazine being arranged with said second end thereof adjacent to the automatic lathe;

a bar guide formed by said magazine and along which the bars are guided to the automatic lathe;

an end bar facing device, arranged at said first end of said magazine to machine a rear end of a bar to be fed to the automatic lathe; and a bar pusher which engages the rear end of said bar, subsequent to face machining thereof, to make the bar advance with an opposite front end thereof towards the automatic lathe.

12. A bar feeder for feeding bars to an automatic lathe, comprising:

a magazine for the bars having a first end and a second opposite end, said magazine being arranged with said second end thereof adjacent to the automatic lathe;

a bar guide formed by said magazine and along which the bars are guided to the automatic lathe;

an end bar facing device, arranged at said first end of said magazine to machine a rear end of a bar to be fed to the automatic lathe;

a bar pusher which engages the rear end of said bar, subsequent to face machining thereof to make the bar advance with an opposite front end thereof towards the automatic lathe; and a tool motorizing unit that comprises: a cylindrical shell, a gear with internally arranged teeth which is fixed inside said cylindrical shell, a sleeve being coaxially and rotationally supported inside said shell so as to rotate about a central axis, a shaft being supported inside said sleeve on a further axis which is eccentric with respect to the central axis of said sleeve, a further gear being keyed on said shaft and meshing with said gear, which is fixed inside the shell, through an opening of said sleeve, a coupling being provided, at a first end of said shaft which is directed towards said side wall, for receiving a tool in a position adapted for machining said bar, a driven pulley being provided at a second opposite end of said shaft a transmission belt, a driving pulley, and an actuation motor which is supported on said cylindrical shell, said driven pulley being connected by way of said transmission belt to said driving pulley, said driving pulley being keyed on a shaft at said actuation motor.

* * * * *